(12) United States Patent
Kozloski et al.

(10) Patent No.: US 11,810,038 B2
(45) Date of Patent: Nov. 7, 2023

(54) RISK OPTIMIZATION THROUGH REINFORCEMENT LEARNING

(71) Applicant: International Business Machines Corporation, Armonk, NY (US)

(72) Inventors: James Robert Kozloski, New Fairfield, CT (US); Timothy Michael Lynar, Melbourne (AU); Suraj Pandey, Melbourne (AU); John Michael Wagner, Plainville, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1176 days.

(21) Appl. No.: 15/202,686

(22) Filed: Jul. 6, 2016

(65) Prior Publication Data

US 2018/0012159 A1     Jan. 11, 2018

(51) Int. Cl.
*G06N 20/00*     (2019.01)
*G06N 7/01*      (2023.01)
*G06Q 10/0635*   (2023.01)
*G06Q 10/0631*   (2023.01)

(52) U.S. Cl.
CPC ........... *G06Q 10/0635* (2013.01); *G06N 7/01* (2023.01); *G06N 20/00* (2019.01); *G06Q 10/063116* (2013.01)

(58) Field of Classification Search
CPC ...... G06N 99/005; G06N 5/025; G06N 7/005; G06N 20/00; G06K 9/6256; G06K 9/6269
USPC .......................................................... 706/12
See application file for complete search history.

(56) References Cited

U.S. PATENT DOCUMENTS

| | | | | |
|---|---|---|---|---|
| 6,931,387 B1* | 8/2005 | Wong | ..................... | G06Q 10/04 706/50 |
| 8,639,556 B2* | 1/2014 | Morimura | .......... | G06Q 10/0635 705/7.28 |
| 8,686,844 B1* | 4/2014 | Wine | ....................... | G08G 1/20 340/439 |
| 8,872,640 B2* | 10/2014 | Horseman | ............. | A61B 5/1114 340/425.5 |
| 10,475,127 B1* | 11/2019 | Potter | .................... | G06Q 40/08 |
| 2005/0049962 A1* | 3/2005 | Porter | ................... | G06Q 40/025 705/38 |

(Continued)

OTHER PUBLICATIONS

Luria et al.—"The effect of workers' visibility on effectiveness of intervention programs: Supervisory-based safety interventions"—2008—https://www.sciencedirect.com/science/article/pii/S0022437508000431 (Year: 2008).*

Zohar et al.—"On the difficulty of promoting workers' safety behaviour: overcoming the underweighting of routine risks"—2007—https://www.researchgate.net/publication/247831499_On_the_difficulty_of_promoting_workers'_safety_behaviour_Overcoming_the_under-weighting_of_routine_risks (Year: 2007).*

(Continued)

*Primary Examiner* — Viker A Lamardo
(74) *Attorney, Agent, or Firm* — Anthony Mauricio Pallone; MCGINN I.P. LAW GROUP, PLLC (57) ABSTRACT

A risk management method, system, and non-transitory computer readable medium, include a data analyzing circuit configured to analyze user data, site data, and equipment data to map prior behavior types to an event on a site, a relationship determining circuit configured to determine a relationship between the mapped data and the event based on behaviors exhibited by the user and an impact on a performance factor and a risk factor, and a reinforcement learning circuit configured to use reinforcement learning to learn the performance factor to the risk factor ratio to optimize an overall site productivity.

18 Claims, 6 Drawing Sheets

(56) References Cited

U.S. PATENT DOCUMENTS

| | | | | |
|---|---|---|---|---|
| 2008/0091515 | A1* | 4/2008 | Thieberger | G06Q 10/04 705/7.11 |
| 2010/0010968 | A1* | 1/2010 | Redlich | G06Q 10/00 707/E17.014 |
| 2012/0072243 | A1* | 3/2012 | Collins | G06Q 10/10 705/4 |
| 2013/0009993 | A1* | 1/2013 | Horseman | G16H 40/63 345/633 |
| 2013/0054215 | A1* | 2/2013 | Stubna | G16Z 99/00 703/11 |
| 2014/0047107 | A1* | 2/2014 | Maturana | G05B 19/056 709/224 |
| 2014/0195272 | A1* | 7/2014 | Sadiq | G06Q 40/08 705/4 |
| 2015/0161872 | A1* | 6/2015 | Beaulieu | G01S 17/06 340/686.6 |
| 2015/0222989 | A1* | 8/2015 | Labrosse | H04R 1/1083 381/71.1 |
| 2015/0242769 | A1* | 8/2015 | Kezeu | G06Q 10/06314 705/7.11 |
| 2017/0031182 | A1* | 2/2017 | Novak | G02C 7/101 |
| 2018/0005161 | A1* | 1/2018 | Cong | G06Q 10/06398 |
| 2019/0027038 | A1* | 1/2019 | Chintakindi | G08G 1/165 |

OTHER PUBLICATIONS

Diane J. Cook—"Health Monitoring and Assistance to Support Aging in Place"—2008—https://web.archive.org/web/20081002142512/ https://www.eecs.wsu.edu/~cook/pubs/ph07.pdf (Year: 2008).*

Jie et al.—"Cumulative Prospect Theory Meets Reinforcement Learning: Prediction and Control"—2016—https://arxiv.org/pdf/ 1506.02632.pdf (Year: 2016).*

Shen et al.—"Risk-sensitive Reinforcement Learning"—2014— https://arxiv.org/abs/1311.2097 (Year: 2014).*

Tixier et al.—"Application of machine learning to construction injury prediction"—2016—https://www.sciencedirect.com/science/ article/pii/S0926580516300966 (Year: 2016).*

Teo et al.—"Fostering safe work behaviour in workers at construction sites"—2005—https://search.proquest.com/docview/218646887/ fulltextPDF/1F44AB25D247481DPQ/1?accountid=14753 (Year: 2005).*

Fullarton et al.—"The utility of a workplace injury instrument in prediction of workplace injury"—2006—https://www.sciencedirect. com/science/article/pii/S0001457506000935 (Year: 2006).*

* cited by examiner

RISK OPTIMIZATION THROUGH REINFORCEMENT LEARNING

BACKGROUND

The present invention relates generally to a risk management system, and more particularly, but not by way of limitation, to a system for modifying user operation of a single piece of equipment at a site where operators and equipment are working in concert to modulate operator behavior to maximize productivity within acceptable safety (risk) limits by managing risk as a resource.

Conventionally, risk has not been treated as a first call resource in work sites (e.g., such as excavation, mining, drilling, construction, etc.). That is, having too much risk can result in catastrophic accidents and having too little risk can halt an operation to a crawl, thereby limiting productivity.

For example, large mining equipment is often expensive to purchase, run, and maintain and at the same time mine sites often wish to maximize equipment usage to ensure productivity. The equipment produces measurable key performance indicators such as the time the operator takes to perform particular tasks as part of a normal productive cycle on a given piece of equipment. Such key performance indicators have the potential to distort operator behavior (e.g. level of aggressiveness) to perform operations at a higher speed and torque resulting in greater risk. In mining, there are often many operators and pieces of equipment working in concert to meet a productive outcome.

Different users exhibit different driving and machine operation behavior. Often, in isolation, aggressive operation of equipment can be advantageous to achieving key performance indicators. However, such behavior can also increase the overall risk at a site. Equipment operating in close proximity increases the number of workers and pieces of equipment that can cause a safety incident. By increasing the speed and tempo of activity, safety vigilance can drop, thus increasing the likelihood of an accident. Risk-taking behavior can often result in better outcomes. Overly cautious operators may not have the same level of productivity as those that possess a greater tolerance for risk. Conversely, those with a high tolerance for risk may engage in dangerous behaviors that have an overall detrimental impact on the site, the company, and potentially productivity.

That is, there is a long-felt need in the art for a risk management technique that can optimize the concert actions of the user, the machines, and the site.

SUMMARY

In view of the long-felt need in the art, the inventors have considered a non-abstract improvement to a computer technology via a technical solution in which a system can optimize total site risk by detecting an operator's tolerance and use of risk and modifying site scheduling to maximize productivity (e.g. movements per hour, tonnage movements, percentage of operations that are machine limited, etc.) within acceptable safety limits with risk versus productivity as a controlling factor.

In an exemplary embodiment, the present invention can provide a risk management system, including a data analyzing circuit configured to analyze user data, site data, and equipment data to map prior behavior types to an event on a site, a relationship determining circuit configured to determine a relationship between the mapped data and the event based on behaviors exhibited by the user and an impact on a performance factor and a risk factor, and a reinforcement learning circuit configured to use reinforcement learning to learn the performance factor to the risk factor ratio to optimize an overall site productivity.

Further, in another exemplary embodiment, the present invention can provide a risk management method, including analyzing user data, site data, and equipment data to map prior behavior types to an event on a site, determining a relationship between the mapped data and the event based on behaviors exhibited by the user and an impact on a performance factor and a risk factor, and learning via reinforcement learning the performance factor to the risk factor ratio to optimize an overall site productivity.

Even further, in another exemplary embodiment, the present invention can provide a non-transitory computer-readable recording medium recording a risk management program, the program causing a computer to perform: analyzing user data, site data, and equipment data to map prior behavior types to an event on a site, determining a relationship between the mapped data and the event based on behaviors exhibited by the user and an impact on a performance factor and a risk factor, and learning via reinforcement learning the performance factor to the risk factor ratio to optimize an overall site productivity.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
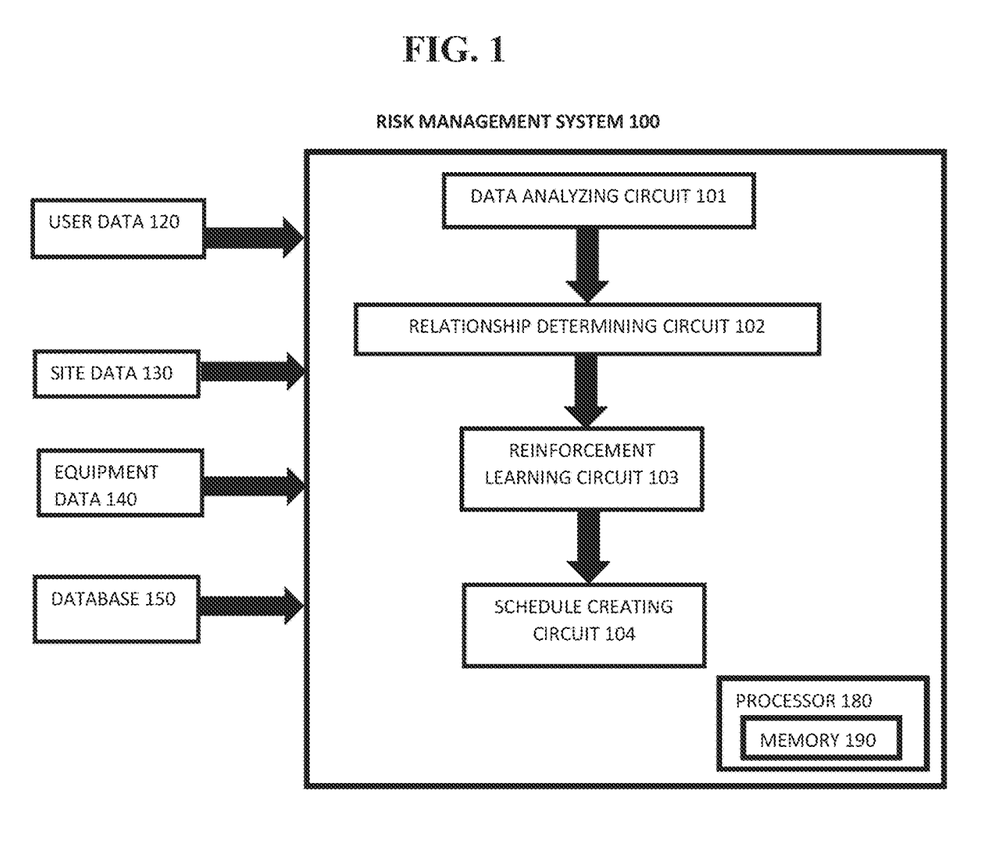
FIG. 1 exemplarily shows a block diagram illustrating a configuration of a risk management system 100.

With reference now to FIG. 1, the risk management system 100 includes a data analyzing circuit 101, a relationship determining circuit 102, a reinforcement learning circuit 103, and a schedule creating circuit 104. The risk management system 100 includes a processor 180 and a memory 190, with the memory 190 storing instructions to cause the processor 180 to execute each circuit of the risk management system 100. The processor and memory may be physical hardware components, or a combination of hardware and software components.

Although the risk management system 100 includes various circuits, it should be noted that a risk management system can include modules in which the memory 190 stores instructions to cause the processor 180 to execute each module of the risk management system 100.

Also, each circuit can be a stand-alone device, unit, module, etc. that can be interconnected to cooperatively produce a transformation to a result.

With the use of these various circuits, the risk management system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 4:
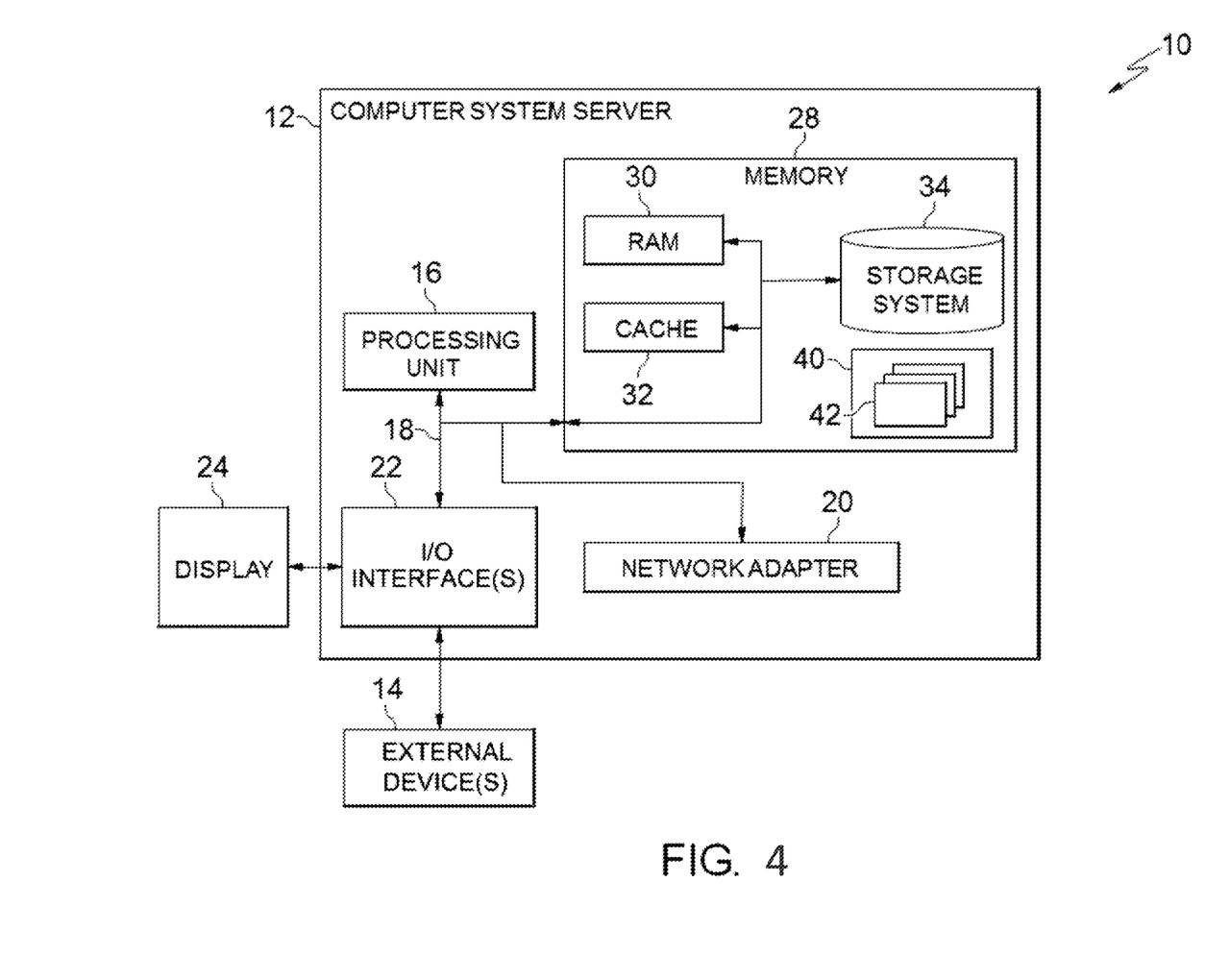
FIG. 4 depicts a cloud-computing node 10 according to an exemplary embodiment of the present invention.
Figure 5:
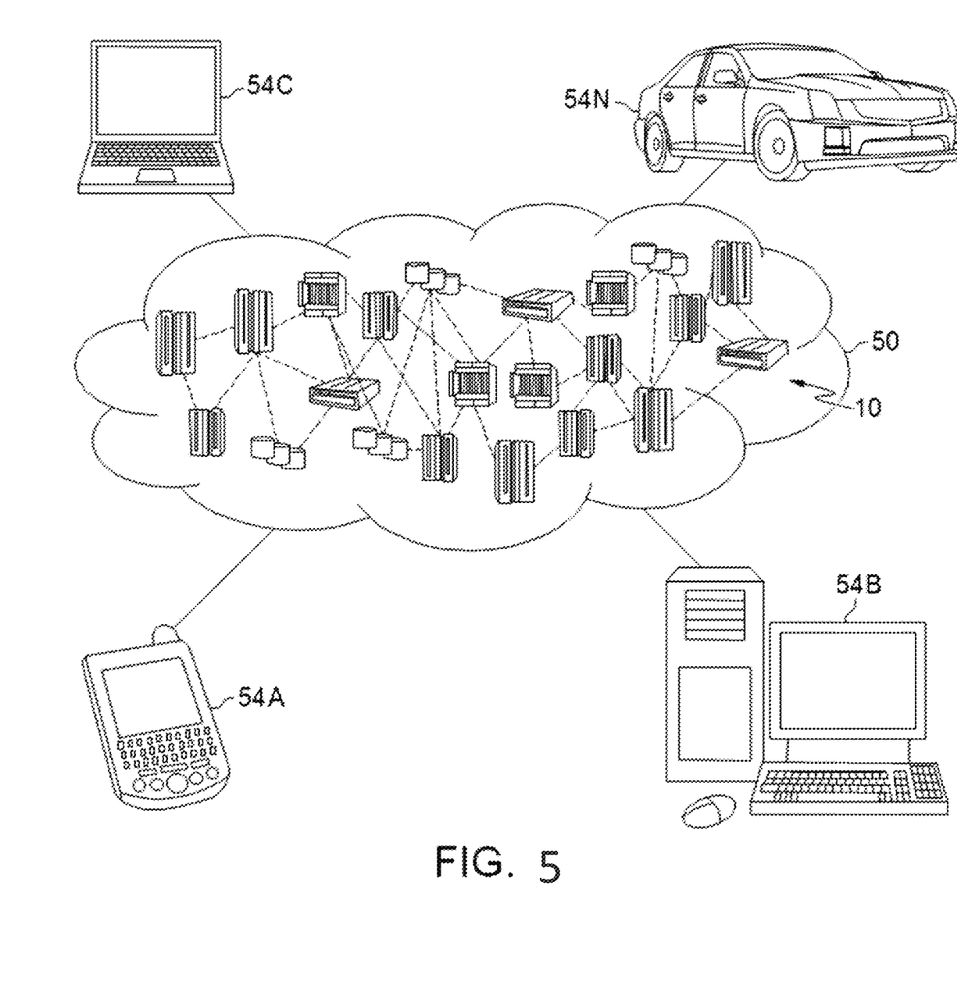
FIG. 5 depicts a cloud-computing environment 50 according to another exemplary embodiment of the present invention.
Figure 6:
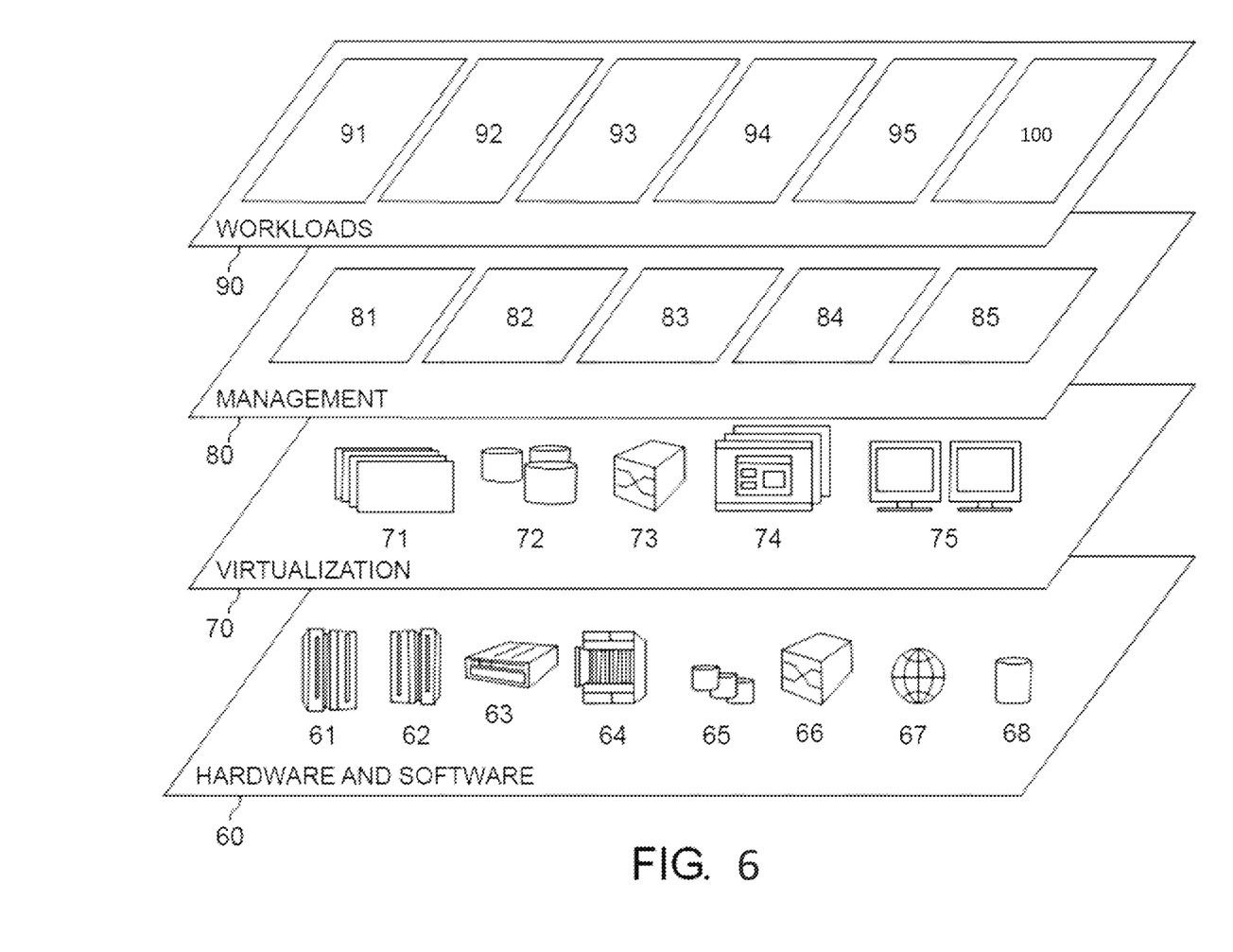
FIG. 6 depicts abstraction model layers according to an exemplary embodiment of the present invention.

Although as shown in FIGS. 4-6 and as described later, the computer system/server 12 is exemplarily shown in cloud-computing node 10 as a general-purpose computing circuit which may execute in a layer the risk management system 100 (FIG. 6), it is noted that the present invention can be implemented outside of the cloud environment.

The risk management system 100 receives a real-time feed of user data 120, site data 130, and equipment data 140 along with past data from the database 150 of the user data 120, the site data 130, and the equipment data 140.

The user data 120 comprises user behavior, machine operation data of the user from both sensors and alarms of the machines, a cognitive state of the user (e.g., distraction level, mood, fatigue level, etc.), a user cohort (e.g., autism, Alzheimer's, Asperger's, etc.), etc. It is noted that various known approaches for estimating a cognitive state or mood, with a confidence level can be used to determine the cognitive state of the user. The user's operation (e.g., user data 120) is monitored and recorded, and includes time spent typing, time spent moussing, and time spent reading (e.g., if equipment requires typing, moussing, reading to operate), changes in acceleration, motion, speed, anomalous movement, abuse of the device by the user, repeated attempts to change configuration, warnings by supervisors, and changes in skin luminescence.

The site data 130 comprises likely interactions between users and equipment (e.g., positional overlaps), a frequency of interactions, a risk of interactions, a risk of position on site, a risk created by site changes over time (e.g., new routes on a mining site create higher flow of equipment in new directions), etc.

The equipment data 140 comprises a type of equipment, a risk associated with various hazards associated with each piece of equipment, a cost of the equipment, an overall contribution to productivity and site output, etc. The equipment data 140 further includes input speed, tempo, and response time. The site data can also include a time of day and background noise.

The data analyzing circuit 101 analyzes (i.e., data-mines) prior behavior types with past performance and accidents from other operators and sites. Behavior types of past performances include, for example, prior accident severity, outcome, a type of accident, etc., a prior performance rate, machine operation data from both sensors and alarms from the operator, etc. That is, the data analyzing circuit maps the user data 120, the site data 130, and the equipment data 140 as well as past data from the database 150 to events on the site.

The relationship determining circuit 102 determines a relationship between the mapped data and the event by using statistical analysis to determine the relationship between the behaviors exhibited by a user and the likely impact on performance and risk.

The reinforcement learning circuit 103 uses a machine learning technique such as model based reinforcement learning to gain an understanding of the relationship between the behaviors exhibited by the user and the likely impact on performance. That is, the reinforcement learning circuit 103 uses reinforcement learning to optimize site risk versus performance, through equipment operator modelling and user profiling behaviors and actions of users based on the relationships determined by the relationship determining circuit 102. Specifically, the reinforcement learning circuit 103 determines a set of stationary policies regarding behaviors and expected reward (e.g., increased productivity) given a current state or context in which a user is in on the site with the equipment, in order to optimize a value function. The reinforcement learning circuit 103 optimizes the value function which a value function attempts to find a policy that maximizes the return by maintaining a set of estimates of expected returns for some policy (e.g., either the "current" or the optimal one). Optimizing a value function relies on the theory of Markov Decision Process (MDPs), where optimality is defined in a sense which is stronger than the stationary policy (e.g., a policy is called "optimal" if it achieves the best expected return from any initial state (i.e., initial distributions play no role in this definition)).

Figure 3:
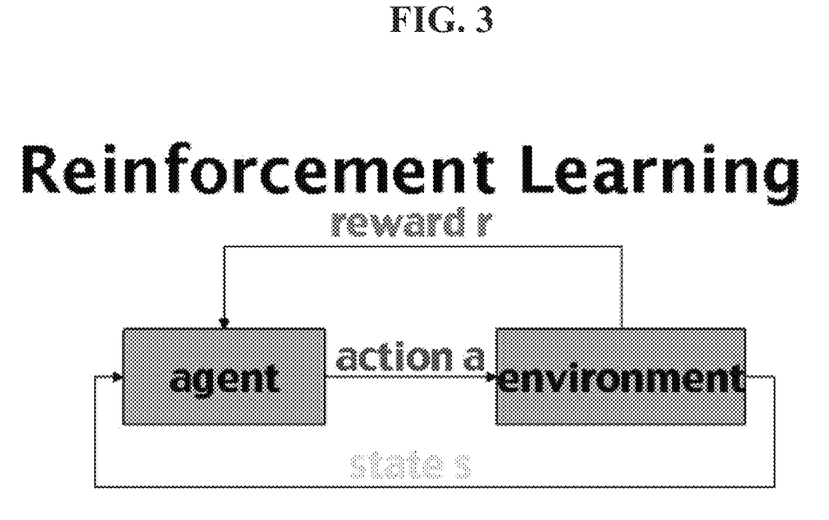
FIG. 3 exemplarily shows a reinforcement learning framework of the reinforcement learning circuit 103 for a value function.

The reinforcement learning circuit 103 operates within the standard reinforcement-learning framework depicted in FIG. 3. The reinforcement learning circuit 103 learns a policy to maximize reward (r) (e.g., productivity on the site), given the state of the environment. The state of the environment (s) may include machinery state, task, user state (including wearable measures), weather, GPS location, imagery and video gathered (from the user's perspective, machinery's perspective, surveillance drone's perspective, etc.). That is, the state of the environment includes the user data 120, the site data 130, the equipment data 140 and past data of the database 150. The reinforcement learning circuit 103 makes use of an MDP to implement an agent policy. Other embodiments make use of learning implemented over both historical and online data to achieve this objective through actions selected and deployed through advisory inputs to an operator. Specifically, the actions (a) may include sounding an alarm, providing specific verbal instructions via text message or synthesized speech, providing map data to an operator, modifying the parameters of a piece of heavy machinery, or disabling the machinery so as to prevent damage.

Based on the actions learned by the reinforcement learning circuit 103 to optimize the productivity versus risk, the schedule creating circuit 104 creates a schedule to optimize overall site performance and risk according to the actions for the users to take (e.g., what, when, and how to do an action for each user of each equipment on the site to optimize the concert actions of the site). The schedule creating circuit 104 takes into account the expected geographic and temporal position of each operator.

In one embodiment, the reinforcement learning circuit 103 can further learn when to encourage users to perform at a desired/predicted level of aggression (e.g., enthusiasm) and the schedule creating circuit 104 inputs the encouragement of the users into the schedule.

Also, a user or system manager can input a desired tolerance level of risk and the system 100 manages the risk (e.g., performance vs. risk) to keep overall risk below the desired tolerance level. For example, some larger sites can tolerate more risk whereas a small site may not be able to tolerate any risk because of costs associated with risk.

Figure 2:
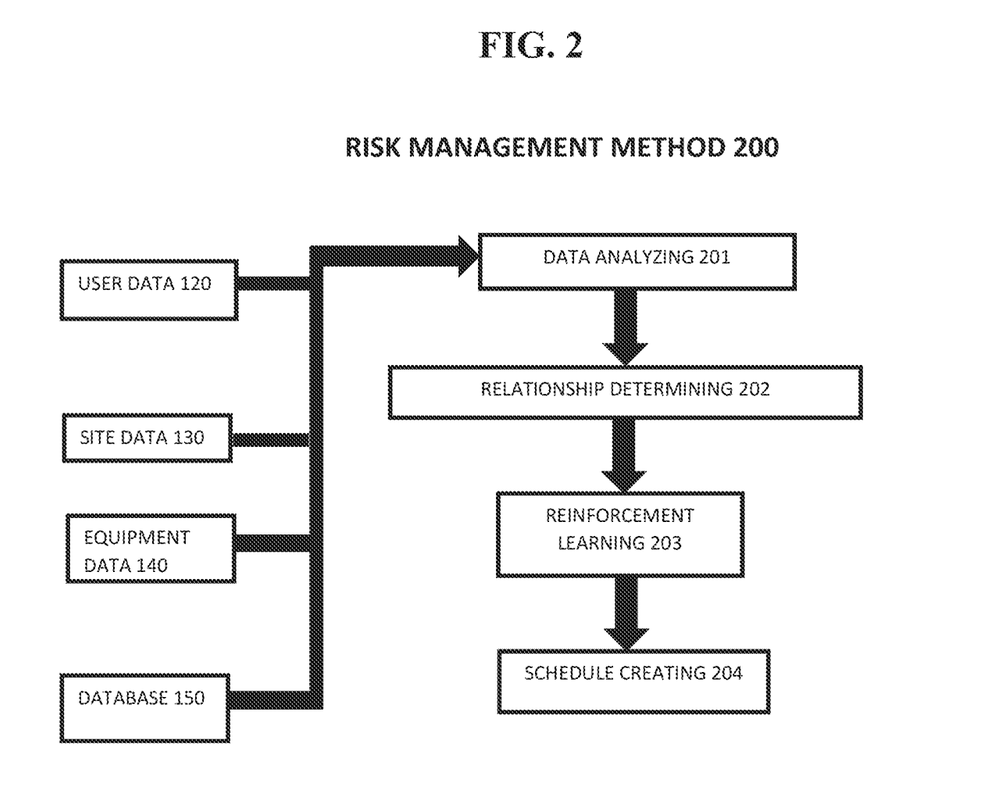
FIG. 2 exemplarily shows a high-level flow chart for a risk management method 200.

FIG. 2 shows a high-level flow chart for a method 200 of risk management.

Step 201 analyzes (i.e., data-mines) prior behavior types with past performance and accidents (e.g., an event) from other operators and sites.

Step 202 determines a relationship between the analyzed data and the event by using statistical analysis to determine the relationship between the behaviors exhibited by a user and the likely impact on performance and risk on the site.

Step 203 uses reinforcement learning to optimize site risk versus performance through equipment user modelling and user profiling behaviors and actions of users based on the relationships determined by Step 202.

Step 204 creates a schedule to optimize overall site performance and risk according to the actions for the users to take (e.g., what, when, and how to do an action for each user of each equipment on the site to optimize the concert actions of the site) based on the reinforcement learning of Step 203.

Thereby, the system 100 and method 200 can optimally schedule users in a site to optimize a sites risk profile at every point in space and time. The user's behavior on a piece of equipment is predicted based on the prior user behavior (or other user behavior or historical other users' behavior that has been aggregated) and correlations (relationships) between that behavior and other users of known behaviors and outcomes.

Also, user input devices can be used to predict optimal settings, where the settings include touch responsiveness of key presses on a touchscreen keyboard, mouse tracking rates, and double click speeds (e.g., if the equipment is remote-controlled or unmanned operated by a remote terminal).

Further, after the schedule is created, user reactions to input device adjustments can be made based on the cognitive model predicted optimal settings (e.g., the schedule), where user reactions include re-adjustments and reversals of adjustments.

Exemplary Hardware Aspects, Using a Cloud-Computing Environment

It is understood in advance that although this disclosure includes a detailed description on cloud-computing, implementation of the teachings recited herein are not limited to a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Referring now to FIG. 4, a schematic of an example of a cloud-computing node is shown. Cloud-computing node 10 is only one example of a suitable cloud-computing node and is not intended to suggest any limitation as to the scope of use or functionality of embodiments of the invention described herein. Regardless, cloud-computing node 10 is capable of being implemented and/or performing any of the functionality set forth hereinabove.

In cloud-computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

As shown in FIG. 4, computer system/server 12 in cloud-computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 5, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud-computing environment 50 can communicate with any type of computerized circuit over any type of network and/or network addressable connection (e.g., using a web browser).

Referring now to FIG. 6, a set of functional abstraction layers provided by cloud-computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the risk management system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A risk management system, comprising:
a processor; and
a memory, the memory storing instructions to cause the processor to:
map user data, site data, and equipment data as well as past data from a database to an event on a site;

determine a relationship between the mapped data and the event based on behaviors exhibited by the user and an impact on a performance factor and a risk factor; and use reinforcement learning via a machine learning algorithm to learn the performance factor to the risk factor ratio to change an overall site productivity, the reinforcement learning determining the change to the performance factor to the risk factor ratio through equipment operator modelling by modelling:
the equipment operation by the user while operating on the site;
user profiling behaviors; and
actions of users based on the relationships determined, wherein an action to collectively change an input into a future of the user data, the site data, and the equipment data in concert is recommended based on a result of the reinforcement learning to achieve the overall site productivity to meet a production outcome by changing an activity pertaining to the user data, the site data, and the equipment data such that the relationship between the mapped data and the event change the performance factor to the risk factor ratio, wherein the equipment data comprises:
a type of equipment; and
a risk associated with a hazard associated with the type of equipment while operating on the site, wherein the user data comprises a cognitive state of the user including a distraction level and a fatigue level, wherein the memory further stores instructions to cause the processor to create a schedule of actions for the user to follow based on the schedule adhering to the changed performance factor to risk factor ratio learned by the reinforcement learning circuit, wherein the user data further comprises a user cohort, and wherein the user data that is collected includes:
time spent typing;
time spent moussing and time spent reading;
repeated attempts to change configuration;
warnings by supervisors;
changes in skin luminescence; and
changes in acceleration that includes motion, speed, and anomalous movement, wherein the collected user data is mapped as mapped user data based on statistical analysis to determine the relationship between the behaviors exhibited by the user and the likely impact on performance and risk, and wherein the mapped user data is run through the reinforcement learning via a model based reinforcement learning technique to gain an understanding of the relationship between the mapped user data and the impact on the performance to modify the change to the performance factor to the risk factor ratio based on a result of the mapped user data run through the model based reinforcement learning technique, further comprising further learning a time to encourage the user to perform at a desired/predicted level of aggression and creating a specific input at the time into the schedule to remind the user.

2. The system of claim 1, wherein the reinforcement learning optimizes the performance factor to the risk factor ratio through the operator modelling, user profiling behaviors, and actions of users based on the relationship determined.

3. The system of claim 1, wherein the memory further stores instructions to cause the processor to determine a set of stationary policies regarding an action and an expected productivity increase of the action given a real-time relationship of the user data, the site data, and the equipment data, in order to optimize a value function having the performance factor to the risk factor ratio as an output of the value function, the value function finds a policy that maximizes a return by maintaining a set of estimates of expected returns for either a current policy or an optimal policy, and optimizing the value function relies on a Markov Decision Process (MDPs), where optimality is defined by stronger than the stationary policy.

4. The system of claim 1, wherein the memory further stores instructions to cause the processor to utilize a Markov Decision Process as part of the machine learning algorithm in the reinforcement learning.

5. The system of claim 1, wherein the performance factor to the risk factor ratio is learned based on the risk factor being greater than a predetermined risk tolerance level.

6. The system of claim 1, wherein the performance factor to the risk factor ratio is dynamically changed based on a real-time feed.

7. The system of claim 1, wherein the site data comprises:
an interaction between a user and the equipment including a positional overlap with other equipment;
a risk of a positon of the user or the user and the equipment on the site; and
a risk created by a site environment change.

8. The system of claim 1, wherein the user data, site data, and equipment data comprise a real-time feed, and
wherein the prior behavior types are stored in a database.

9. The system of claim 1, wherein the prior behavior types comprise:
a prior accident severity;
a prior accident outcome;
a type of accident; and
a prior performance rate.

10. The system of claim 1, wherein the reinforcement learning further modifies the change to the performance factor to the risk factor ratio based on:
time spent typing;
time spent moussing and time spent reading;
repeated attempts to change configuration;
warnings by supervisors; and
changes in skin luminescence.

11. A risk management method, comprising:
mapping user data, site data, and equipment data as well as past data from a database to an event on a site;
determining a relationship between the mapped data and the event based on behaviors exhibited by the user and an impact on a performance factor and a risk factor;
using reinforcement learning via a machine learning algorithm to learn the performance factor to the risk factor ratio to change an overall site productivity, the reinforcement learning determining the change to the performance factor to the risk factor ratio through equipment operator modelling by modelling:
the equipment operation by the user while operating on the site;
user profiling behaviors; and
actions of users based on the relationships determined; and
recommending an action to collectively change an input into a future of the user data, the site data, and the equipment data in concert based on a result of the reinforcement learning to achieve the overall site productivity to meet a production outcome by changing an activity pertaining to the user data, the site data, and the equipment data such that the relationship between the mapped data and the event change the performance factor to the risk factor ratio,
wherein the equipment data comprises:
  a type of equipment; and
  a risk associated with a hazard associated with the type of equipment while operating on the site,
wherein the user data comprises a cognitive state of the user including a distraction level and a fatigue level,
wherein the method further includes creating a schedule of actions for the user to follow based on the schedule adhering to the changed performance factor to risk factor ratio learned by the reinforcement learning,
wherein the user data that is collected includes:
  time spent typing;
  time spent moussing and time spent reading;
  repeated attempts to change configuration;
  warnings by supervisors;
  changes in skin luminescence; and
  changes in acceleration that includes motion, speed, and anomalous movement,
wherein the collected user data is mapped as mapped user data based on statistical analysis to determine the relationship between the behaviors exhibited by the user and the likely impact on performance and risk, and
wherein the mapped user data is run through the reinforcement learning via a model based reinforcement learning technique to gain an understanding of the relationship between the mapped user data and the impact on the performance to modify the change to the performance factor to the risk factor ratio based on a result of the mapped user data run through the model based reinforcement learning technique,
further comprising further learning a time to encourage the user to perform at a desired/predicted level of aggression and creating a specific input at the time into the schedule to remind the user.

12. The method of claim 11, further comprising creating a schedule of actions for the user to follow based on the schedule adhering to the changed performance factor to risk factor ratio learned by the learning.

13. The method of claim 11, wherein the learning uses the reinforcement learning to change the performance factor to the risk factor ratio through equipment operator modelling, user profiling behaviors, and actions of users based on the relationship determined by the determining.

14. The method of claim 11, wherein the learning determines a set of stationary policies regarding an action and an expected productivity increase of the action given a real-time relationship of the user data, the site data, and the equipment data, in order to change a value function having the performance factor to the risk factor ratio as an output of the value function.

15. The method of claim 11, wherein the learning utilizes a Markov Decision Process as part of the machine learning algorithm in the reinforcement learning.

16. The method of claim 11, wherein the performance factor to the risk factor ratio is learned based on the risk factor being greater than a predetermined risk tolerance level.

17. A non-transitory computer-readable recording medium recording a risk management program, the program causing a computer to perform:

mapping user data, site data, and equipment data as well as past data from a database to an event on a site;
determining a relationship between the mapped data and the event based on behaviors exhibited by the user and an impact on a performance factor and a risk factor;
using reinforcement learning via a machine learning algorithm to learn the performance factor to the risk factor ratio to change an overall site productivity, the reinforcement learning determining the change to the performance factor to the risk factor ratio through equipment operator modelling by modelling:
  the equipment operation by the user while operating on the site;
  user profiling behaviors; and
  actions of users based on the relationships determined; and
recommending an action to collectively change an input into a future of the user data, the site data, and the equipment data in concert based on a result of the reinforcement learning to achieve the overall site productivity to meet a production outcome by changing an activity pertaining to the user data, the site data, and the equipment data such that the relationship between the mapped data and the event change the performance factor to the risk factor ratio,
wherein the equipment data comprises:
  a type of equipment; and
  a risk associated with a hazard associated with the type of equipment while operating on the site,
wherein the user data comprises a cognitive state of the user including a distraction level and a fatigue level,
further comprising creating a schedule of actions for the user to follow based on the schedule adhering to the changed performance factor to risk factor ratio learned by the reinforcement learning circuit,
wherein the user data that is collected includes:
  time spent typing;
  time spent moussing and time spent reading;
  repeated attempts to change configuration;
  warnings by supervisors;
  changes in skin luminescence; and
  changes in acceleration that includes motion, speed, and anomalous movement,
wherein the collected user data is mapped as mapped user data based on statistical analysis to determine the relationship between the behaviors exhibited by the user and the likely impact on performance and risk, and
wherein the mapped user data is run through the reinforcement learning via a model based reinforcement learning technique to gain an understanding of the relationship between the mapped user data and the impact on the performance to modify the change to the performance factor to the risk factor ratio based on a result of the mapped user data run through the model based reinforcement learning technique,
further comprising further learning a time to encourage the user to perform at a desired/predicted level of aggression and creating a specific input at the time into the schedule to remind the user.

18. The non-transitory computer-readable recording medium of claim 17, wherein the performance factor to the risk factor ratio is learned based on the risk factor being greater than a predetermined risk tolerance level.

* * * * *